US012602741B2

(12) United States Patent
Bleyer et al.

(10) Patent No.: US 12,602,741 B2
(45) Date of Patent: Apr. 14, 2026

(54) SYSTEMS AND METHODS REGULATING FILTER STRENGTH FOR TEMPORAL FILTERING

(71) Applicant: Microsoft Technology Licensing, LLC, Redmond, WA (US)

(72) Inventors: Michael Bleyer, Seattle, WA (US); Christian Markus Maekelae, Redmond, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 18/465,851

(22) Filed: Sep. 12, 2023

(65) Prior Publication Data

US 2025/0086754 A1 Mar. 13, 2025

(51) Int. Cl.
G06T 7/246 (2017.01)
G06T 5/10 (2006.01)
G06T 5/50 (2006.01)

(52) U.S. Cl.
CPC .................. G06T 5/10 (2013.01); G06T 5/50 (2013.01); G06T 7/248 (2017.01); G06T 2207/20024 (2013.01)

(58) Field of Classification Search
CPC ... G06T 5/10; G06T 5/50; G06T 2207/20201; G06T 2207/20212; G06T 2207/20024
USPC .......................... 382/100, 260, 261, 275, 274
See application file for complete search history.

(56) References Cited

U.S. PATENT DOCUMENTS

| | | | |
|---|---|---|---|
| 2013/0083246 A1* | 4/2013 | Chen .......................... | G06T 5/70 348/E5.077 |
| 2013/0201405 A1* | 8/2013 | Chen ...................... | H04N 7/012 348/699 |
| 2022/0138964 A1* | 5/2022 | Gintsburg .............. | H04N 23/72 382/103 |

FOREIGN PATENT DOCUMENTS

WO WO-2022093478 A1 * 5/2022 ............. G06T 7/246

* cited by examiner

*Primary Examiner* — Jamares Q Washington
(74) *Attorney, Agent, or Firm* — Workman Nydegger

(57) ABSTRACT

A system for regulating temporal filtering strength is configurable to: (i) obtain a light level indicator indicating light level associated with a real-world environment; (ii) determine a motion compensation confidence indicator using a current image and a previous image; (iii) determine a filter weight by processing the light level indicator and the motion compensation confidence indicator using a filter strength regulation module; and (iv) generate an output image by using at least the filter weight to filter a current frame with a previous frame.

18 Claims, 12 Drawing Sheets

|  | No Motion (Speed 0) | Slow Motion (Speed 0.5) | Fast Motion (Speed 1) |
|---|---|---|---|
| Full Moon (Gain 14) | 8.60 | 9.97 | 11.25 |
| Quarter Moon (Gain 20) | 8.47 | 12.72 | 14.74 |
| High StarLight (Gain 30) | 8.75 | 12.70 | 16.09 |
| Low StarLight (Gain 69) | 10.83 | 20.21 | 29.71 |

*FIG. 4*

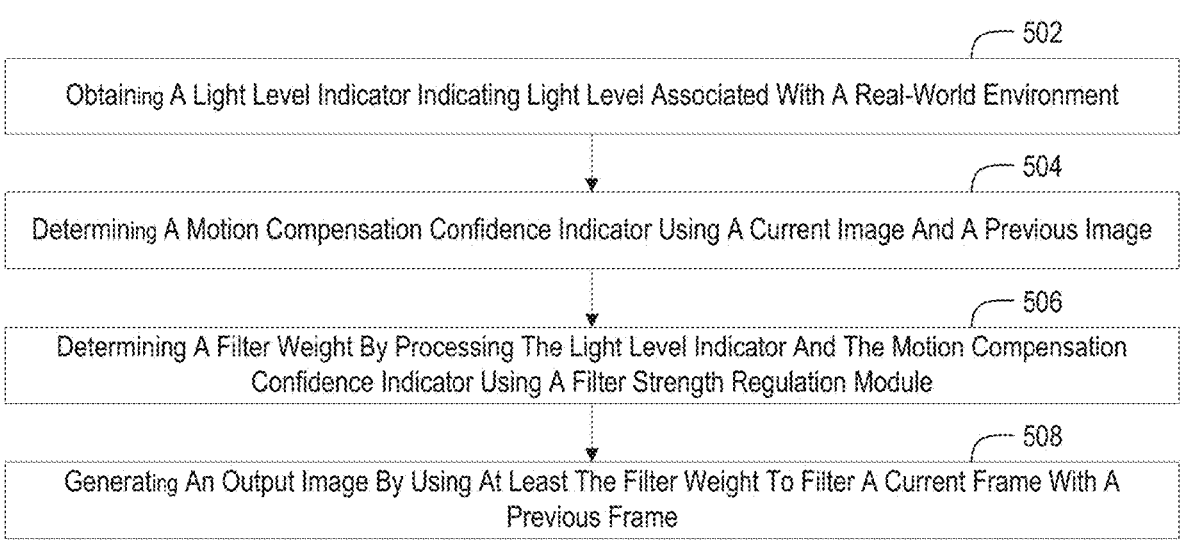

502

Obtaining A Light Level Indicator Indicating Light Level Associated With A Real-World Environment

504

Determining A Motion Compensation Confidence Indicator Using A Current Image And A Previous Image

506

Determining A Filter Weight By Processing The Light Level Indicator And The Motion Compensation Confidence Indicator Using A Filter Strength Regulation Module

508

Generating An Output Image By Using At Least The Filter Weight To Filter A Current Frame With A Previous Frame

*FIG. 5*

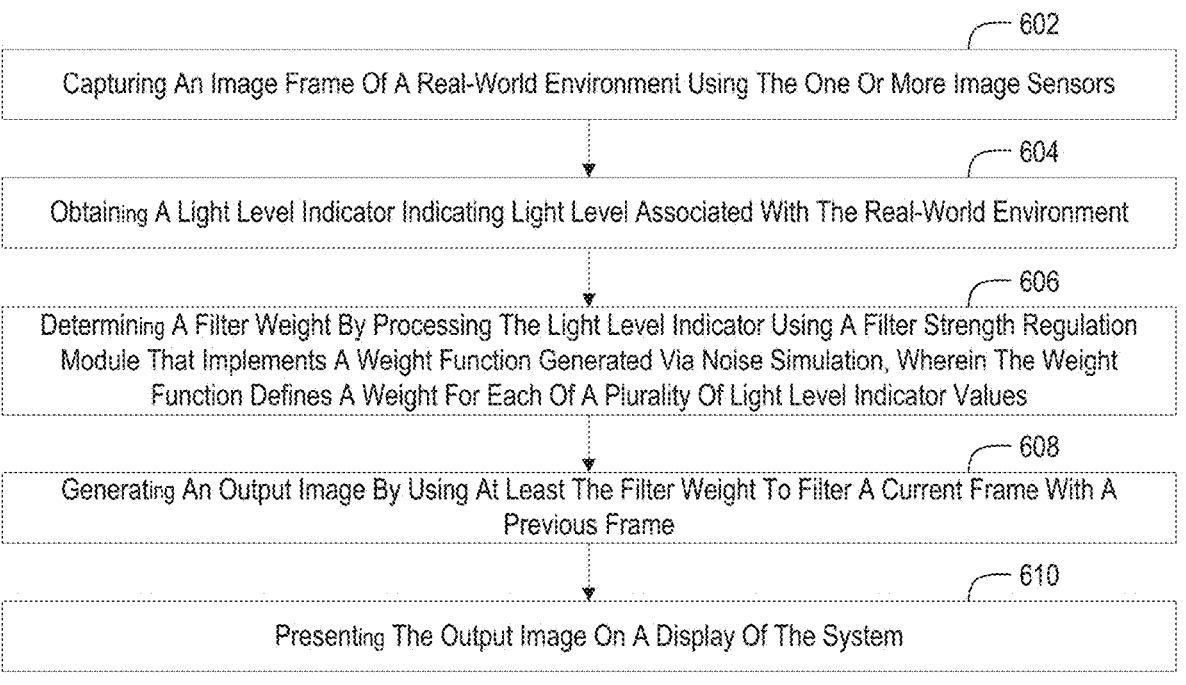

602

Capturing An Image Frame Of A Real-World Environment Using The One Or More Image Sensors

604

Obtaining A Light Level Indicator Indicating Light Level Associated With The Real-World Environment

606

Determining A Filter Weight By Processing The Light Level Indicator Using A Filter Strength Regulation Module That Implements A Weight Function Generated Via Noise Simulation, Wherein The Weight Function Defines A Weight For Each Of A Plurality Of Light Level Indicator Values

608

Generating An Output Image By Using At Least The Filter Weight To Filter A Current Frame With A Previous Frame

610

Presenting The Output Image On A Display Of The System

FIG. 6

Determining A Motion Compensation Confidence Indicator Using A Current Image And A Previous Image — 702

Determining A Filter Weight By Processing The Motion Compensation Confidence Indicator Using A Filter Strength Regulation Module — 704

Generating An Output Image By Using At Least The Filter Weight To Filter A Current Frame With A Previous Frame — 706

SYSTEMS AND METHODS REGULATING FILTER STRENGTH FOR TEMPORAL FILTERING

BACKGROUND

Mixed-reality (MR) systems, including virtual-reality and augmented-reality systems, have received significant attention because of their ability to create truly unique experiences for their users. For reference, conventional virtual reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras and utilize images and/or depth information obtained using the camera(s) to provide pass-through views of a user's environment to the user. A pass-through view can aid users in avoiding disorientation and/or safety hazards when transitioning into and/or navigating within a mixed-reality environment. Pass-through views may also enhance user views in low-visibility environments. For example, mixed-reality systems configured with long-wavelength thermal imaging cameras may facilitate visibility in smoke, haze, fog, and/or dust. Likewise, mixed-reality systems configured with low-light imaging cameras facilitate visibility in dark environments where the ambient light level is below the level required for human vision.

An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

Pass-through imaging can provide various beneficial user experiences, such as enabling users to perceive their surroundings in situations where ordinary human perception is limited. For instance, an MR system may be equipped with thermal cameras and be configured to provide pass-through thermal imaging, which may enable users to perceive objects in their environment even when smoke or fog is present. As another example, an MR system may be equipped with low light cameras and be configured to provide pass-through low light imaging, which may enable users to perceive objects in dark environments.

In the example of low light imaging conditions, individual image frames captured by an image sensor may fail to capture sufficient scene information to provide an interpretable image to the user. When the image sensor is implemented on a moving user device, such as an MR system, implementing a long exposure time to enable an image frame to capture additional scene information can result in blurred images (e.g., brought about by motion of the image sensor during image capture).

Accordingly, many low light image sensors operate by capturing temporally consecutive image frames and combining the consecutive image frames (i.e., performing temporal filtering) to generate output imagery for display to a user. Many systems perform motion compensation to account for motion of the image sensor while capturing the temporally consecutive image frames. For instance, inertial tracking data may be obtained while capturing consecutive image frames, and the inertial tracking data may be used to align the consecutive image frames (e.g., to a current position, or to a position at which output imagery will be displayed). The aligned image frames may then be combined from output imagery that includes more scene information than an individual image frame could provide on its own.

The subject matter claimed herein is not limited to embodiments that operate only in environments such as those described above. Rather, this background is only provided to illustrate one example technology area where some embodiments described herein may be practiced.

BRIEF DESCRIPTION OF THE DRAWINGS

To describe how the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIG. 4 illustrates a table of spatial noise data collected from a user study, which may be used to generate a weight function to determine filter weights based on light level indicator and/or motion compensation confidence indicator.

FIGS. 5, 6, and 7 illustrate example flow diagrams depicting acts associated with regulating filter strength for temporal filtering, in accordance with implementations of the present disclosure.

DETAILED DESCRIPTION

Figure 1:
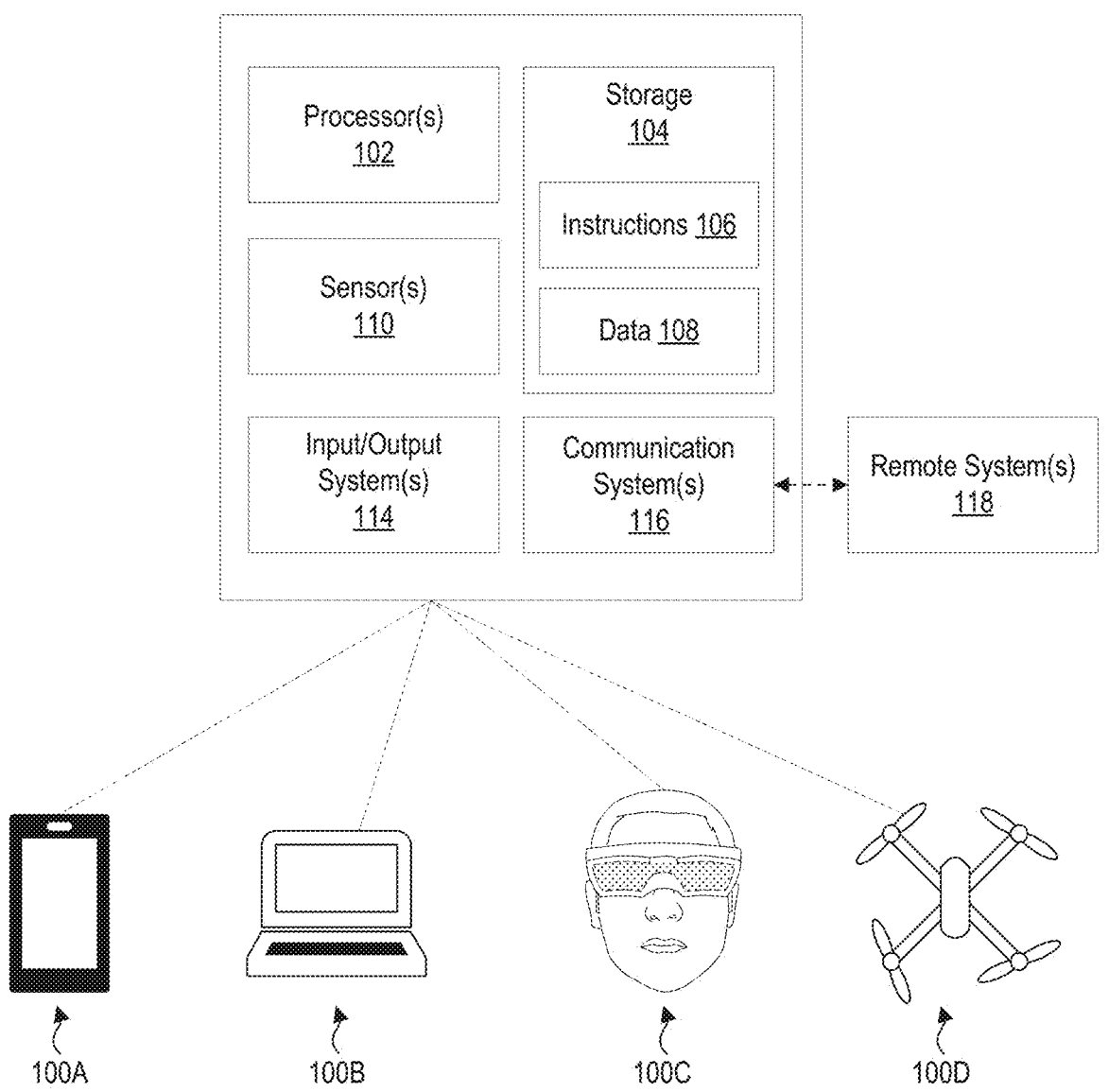
FIG. 1 illustrates example components of an example system that may include or be used to implement one or more disclosed embodiments.

Disclosed embodiments are generally directed to systems, methods, and apparatuses for regulating filter strength for temporal filtering.

Examples of Technical Benefits, Improvements, and Practical Applications

As noted above, many image sensors operate by acquiring temporally consecutive image frames and combining the consecutive image frames to generate output imagery for display to a user. A previous image frame can be combined with a current image frame (e.g., in a weighted manner) to provide the output image. Such methods for combining temporally consecutive image data to generate an output image is referred to herein as "temporal filtering". In one example, to perform temporal filtering, a current frame and a previous frame are used as inputs, and an output image is computed as a weighted average of the two frames. In some instances, the previous frame comprises a previously generated output image, such that only two images are used in the image processing pipeline. Upon acquisition of a new output image, the new output image can be stored for use as a previous frame to be combined with a subsequently captured frame to generate a subsequent output image.

To facilitate alignment of a previous image frame and a current image frame prior to (or as part of) temporal filtering, many systems perform motion compensation to account for motion of the image sensor during image capture. Often, inertial tracking data is obtained during image capture, and the inertial tracking data is used to align the temporally consecutive image frames. In some implementations, inertial tracking data is acquired using an inertial measurement unit (IMU), which may comprise one or more accelerometers, gyroscopes, magnetometers, etc. Temporal filtering methods may employ additional or alternative types of motion compensation techniques, such as those that at least partially rely on optical flow calculations. In some instances, temporal filtering does not utilize motion compensation.

One challenge associated with temporal filtering is selecting an appropriate weight for combining the previous frame with the current frame to generate the output image. In some implementations, a high filter weight biases the output image toward the previous frame (e.g., a higher filter weight causes more filtering), whereas a low filter weight has the opposite effect of biasing the output image toward the current frame (e.g., a lower filter weight causes less filtering). Utilizing a high filter weight can lead to improved signalto-noise ratio (SNR) and/or improved image quality in output imagery. However, utilizing a high filter weight can lead to image artifacts resulting from moving objects in the scene, imperfections in motion compensation for static scenes, and/or problems due to abrupt changes in illumination (e.g., flashing lights). Furthermore, utilizing a higher filter weight can lead to a perceived reduction in frame rate and/or a perceived increase in latency.

At least some disclosed embodiments are directed to regulating filter strength for temporal filtering in a manner that results in application of a high amount of temporal filtering when (i) the quality of the output image is likely to be degraded in the absence of temporal filtering and (ii) applying temporal filtering is unlikely to cause significant image artifacts. In some implementations, such functionality is achieved by regulating filter strength according to at least two aspects: (1) signal level dependent filter strength regulation and (2) motion compensation reliability dependent filter strength regulation.

As will be described in more detail hereinafter, signal level dependent filter strength regulation can include selectively applying a high filter strength when the SNR of the input imagery is low (e.g., in low illumination environments). Regulating filter strength in such a manner can advantageously prevent users from perceiving a lower framerate in well-illuminated environments. Motion compensation reliability dependent filter strength regulation can include selectively applying a high filter strength when motion compensation applied to align the input imagery is determined to be sufficiently accurate. Regulating filter strength in such a manner can advantageously reduce motion trails, ghosting, and/or other motion-related artifacts that can arise from camera motion and/or from moving objects in the captured scene.

Temporal filtering methods may utilize local and/or global weights to facilitate frame combination. The techniques described herein deal primarily with selection of global weights (though at least some principles discussed herein may be applied to determine local weights).

Although at least some examples herein are focused, in at least some respects, on utilizing (1) signal level dependent filter strength regulation and (2) motion compensation reliability dependent filter strength regulation in combination with one another, these aspects of filter strength regulation may be applied separately and individually. For instance, a system may utilize signal level dependent filter strength regulation in the absence of motion compensation reliability dependent filter strength regulation, or vice-versa.

Although at least some examples herein are focused, in at least some respects, on facilitating temporal filter strength regulation of HMD imagery, one will appreciate, in view of the present disclosure, that the principles discussed herein may be applied to facilitate temporal filter strength regulation of any type of imagery (e.g., images captured by one or more mobile electronic devices, smartphones, tablets, smartwatches, drones, autonomous vehicles, etc.).

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise one or more computer-readable recording media and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultrawideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors (as will be described in more detail hereinbelow), image sensors, microphones, thermometers, barometers, magnetometers, accelerometers, gyroscopes, and/or others.

Furthermore, FIG. 1 illustrates that a system 100 may comprise or be in communication with 1/O system(s) 114. I/O system(s) 114 may include any type of input or output device such as, byway of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), other devices (e.g., self-driving vehicles), combinations thereof, etc. A system 100 may take on other forms in accordance with the present disclosure.

Temporal Filtering Strength Regulation

Figure 2A:
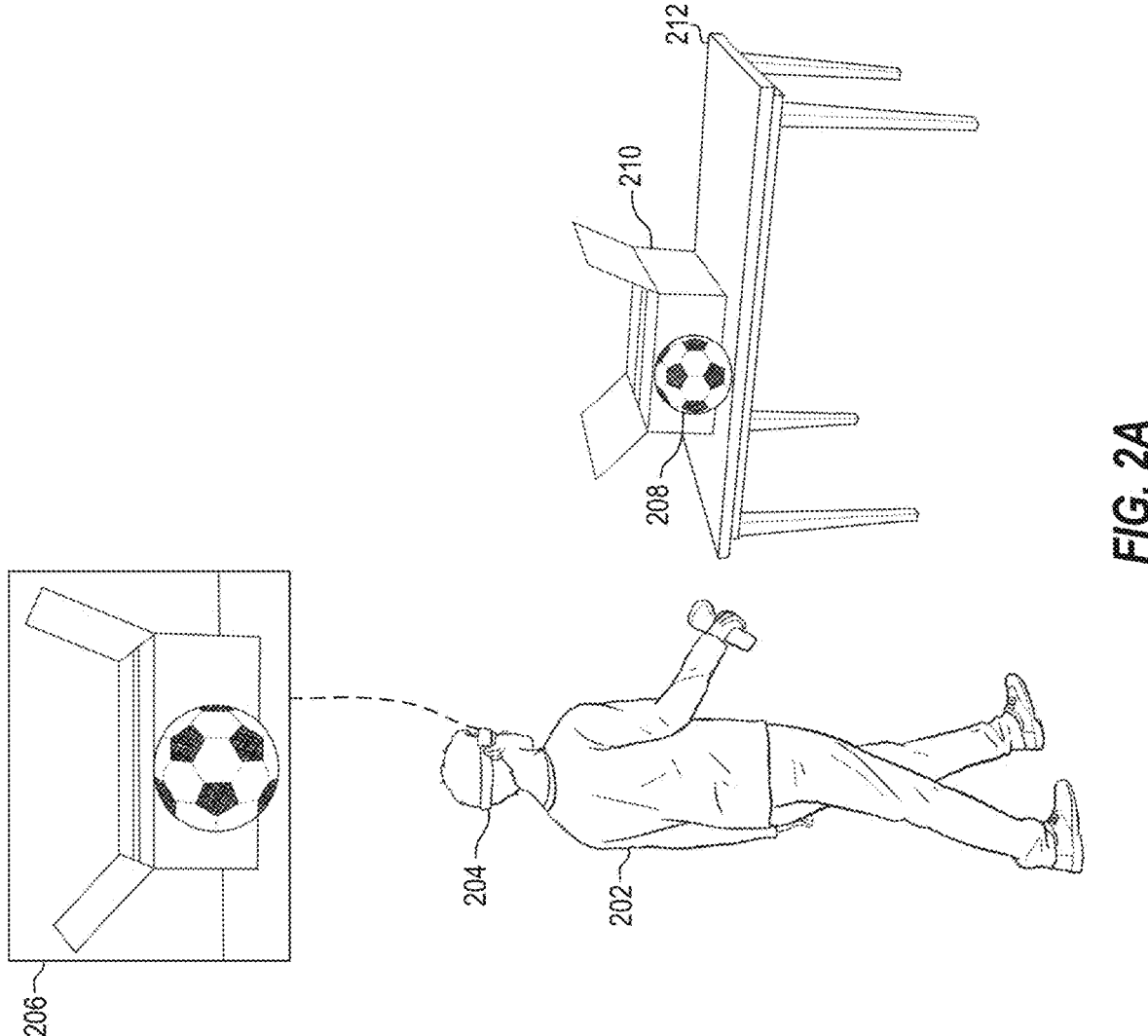
FIG. 2A illustrates a conceptual representation of a current image of objects within a scene at a current timepoint captured by an HMD camera.

FIG. 2A illustrates an example use case where a user 202 operates a head-mounted display 204 (HMD 204) as part of a mixed reality experience. The HMD 204 may comprise various components of a system 100. For instance, in the example of FIG. 2A, the HMD 204 includes one or more image sensors (e.g., sensor(s) 110) that capture an image 206 of the environment. In the example of FIG. 2A, the image 206 captures portions of a ball 208, a box 210, and a table 212 positioned within the environment near the user 202. The HMD 204 may acquire imagery of the surrounding environment for various purposes, such as to facilitate pass-through imaging or computer vision tasks.

Figure 2B:
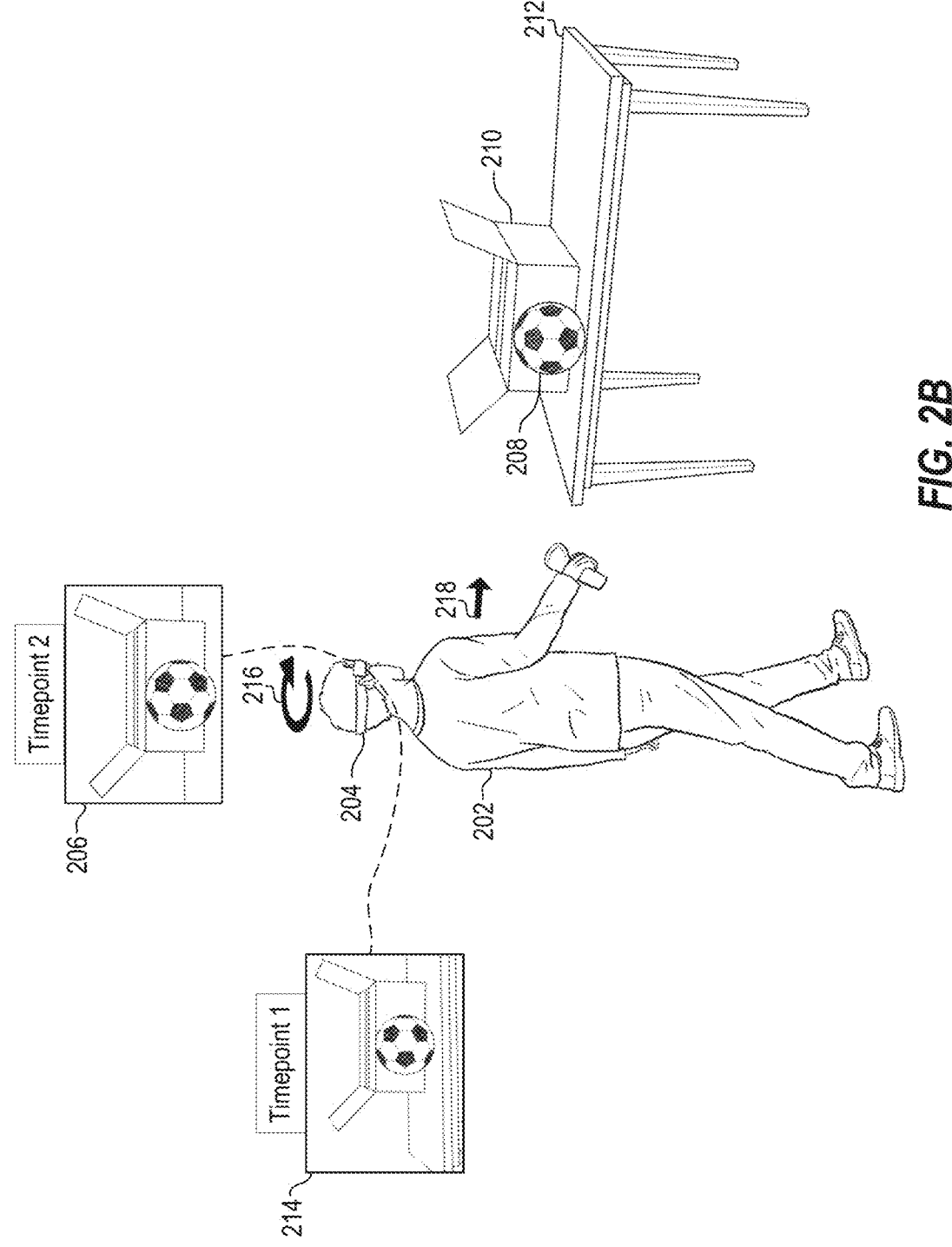
FIG. 2B illustrates a conceptual representation of a previous image of the scene acquired by the HMD in association with a previous timepoint and conceptually depicts motion that occurred from the previous timepoint to the current timepoint.

In some implementations, the image 206 captured by the HMD 204 is one image frame of a group of consecutively captured frames (e.g., a video stream). For instance, FIG. 2B illustrates image 206 in association with a particular timepoint (i.e., "timepoint 2"). FIG. 2B also depicts another image 214 associated with a different timepoint (i.e., "timepoint 1"). Image 214 also depicts features of the ball 208, box 210, and table 212 of the environment of user 202. In the example of FIG. 2B, image 214 is associated with a timepoint that precedes the timepoint associated with image 206. Image 214 may comprise an image captured by the HMD 204, or may be a composite or output image determined based upon imagery captured by the HMD 204 (e.g., based upon images captured at multiple timepoints, each of which may precede "timepoint 2" associated with image 206).

As noted above, systems may combine multiple images to form output imagery, such as when imaging under low light conditions (e.g., where each individual frame captures few photons, and combination of frames enables generation of user-interpretable output imagery). However, as also noted above, images associated with different timepoints can also be associated with different image capture positions. For instance, FIG. 2B conceptually depicts rotational movement 216 and/or translational movement 218 of the HMD 204 brought about by rotation of the head of the user 202 and/or walking of the user 202 from timepoint 1 to timepoint 2. Such movement from timepoint 1 to timepoint 2 can cause differences in the depictions of the ball 208, the box 210, and the table 212 in the different images 206 and 214. For instance, image 206 provides a spatially offset and zoomed representation of the ball 208, the box 210, and the table 212 relative to the representations of the ball 208, the box 210, and the table shown in image 214.

Figure 2C:
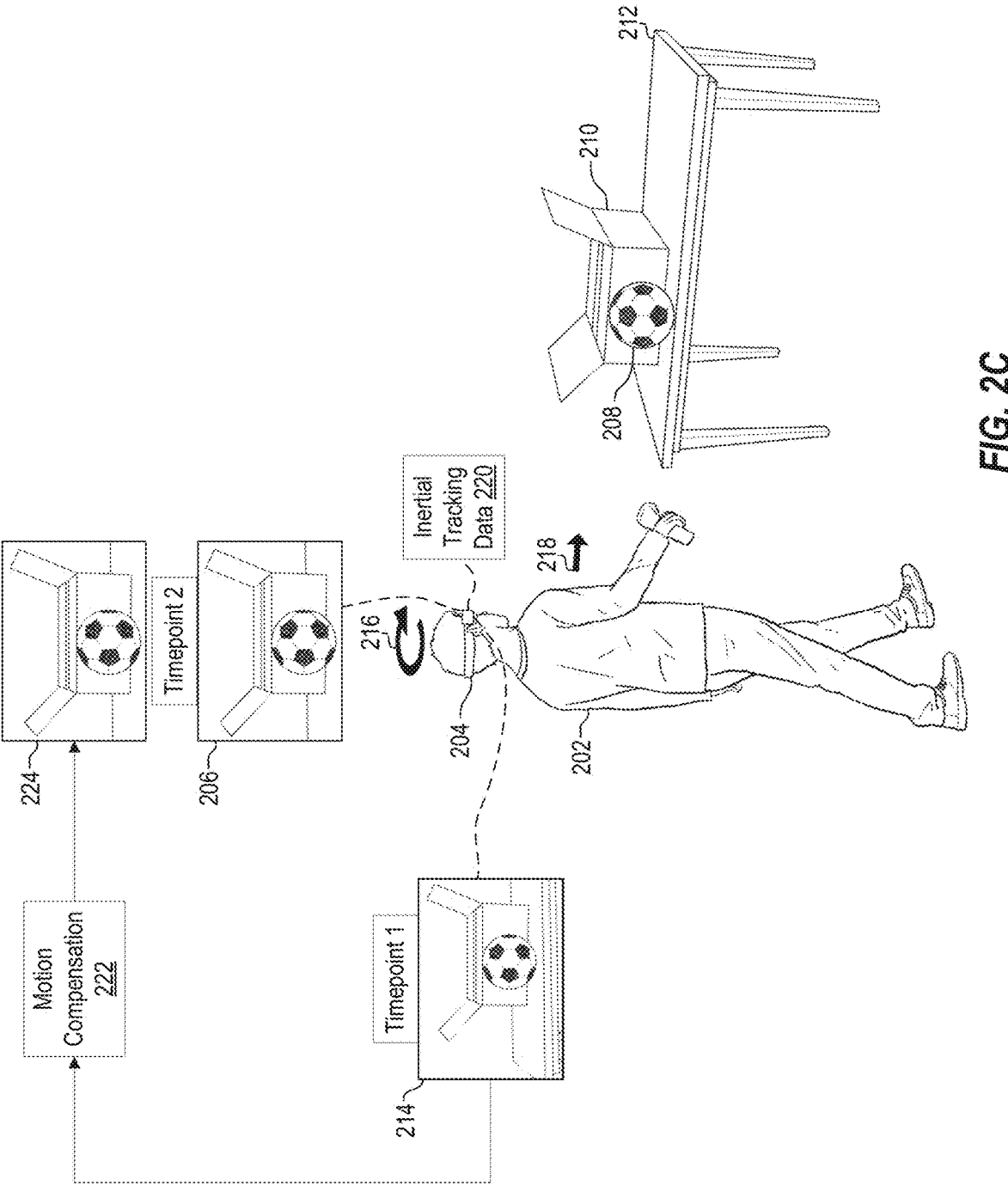
FIG. 2C illustrates a conceptual representation of applying motion compensation to the previous image to obtain a motion compensated image.

FIG. 2C conceptually depicts motion compensation 222, which may be performed using image 214 as an input to generate a motion compensated image 224. Motion compensation 222 attempts to generate an image (i.e., motion compensated image 224) that is spatially aligned with image 206. Stated differently, motion compensation 222 may be performed to modify image 214 to appear as though it were captured from the same camera position as that of image 206.

Motion compensation 222 may employ various techniques. For instance, motion compensation 222 may rely at least in part on inertial tracking data 220 captured by the HMD 204 (e.g., captured by an IMU or other sensor 110 of the HMD 204). The inertial tracking data 220 may comprise 3D rotation data representative of the rotational movement 216 experienced by the HMD 204 from timepoint 1 to timepoint 2. For instance, the inertial tracking data 220 may comprise a delta pose indicating three rotation angles (e.g., yaw, pitch, and roll) that correspond to the rotational movement 216. A rotation model may be constructed based on the inertial tracking data 220 and applied to image 206 via motion compensation 222 to generate the motion compensated image 224.

Additional or alternative motion compensation techniques may be utilized within the scope of the present disclosure, such as techniques that implement optical flow. In some instances, no motion compensation is performed. Accordingly, the techniques discussed hereinbelow that utilize motion compensated image 224 as an input may alternatively utilize a prior-timepoint input image upon which no motion compensation has been performed (e.g., image 214).

Figure 2D:
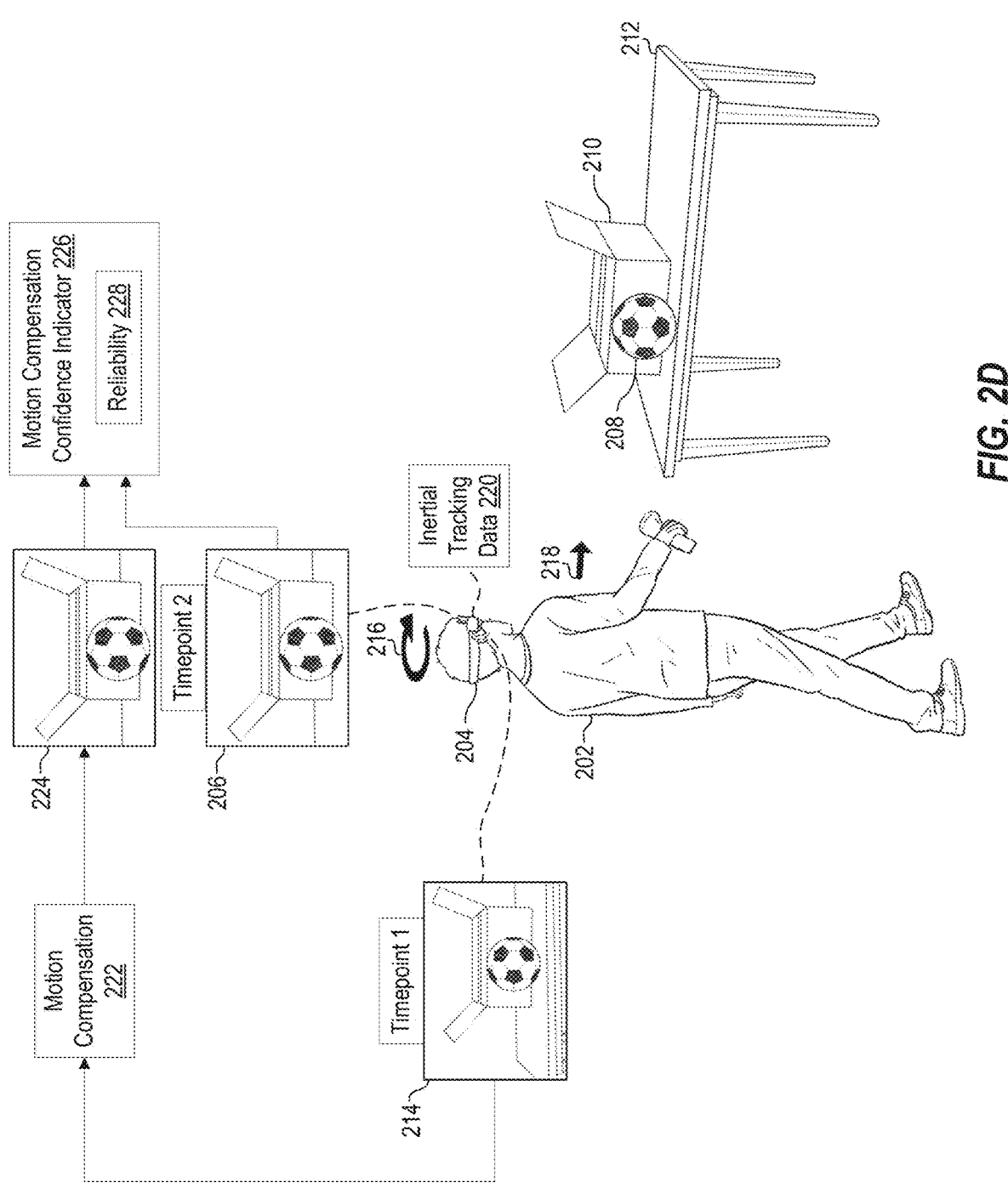
FIG. 2D illustrates a conceptual representation of determining a motion compensation confidence indicator based on the motion compensated image and the current image.

In at least some implementations, strong temporal filtering is applied in response to determining that motion compensation 222 is accurate. FIG. 2D illustrates a conceptual representation of determining a motion compensation confidence indicator 226 based on motion compensated image 224 and image 206. In the present example, motion compensated image 224 (on which motion compensation 222 has been performed) is utilized to determine the motion compensation confidence indicator 226, though any prior-timepoint image may be utilized.

In the example of FIG. 2D, the motion compensation confidence indicator 226 may be determined by determining the optical flow between motion compensated image 224 and image 206. Various optical flow techniques may be utilized to determine the motion compensation confidence indicator 226, such as the Lucas-Kanade method (e.g., resulting in a single motion/affine model for the whole image), determining flow vectors or motion models for each individual pixel, determining motion vectors from video compression modules, etc.

In some instances, the motion compensation confidence indicator 226 comprises or is based on the mean magnitude of the optical flow vectors/motion models over all pixels. When the motion compensation 222 applied to image 214 to obtain motion compensated image 224 is accurate, the mean magnitude is expected to be low (e.g., where little motion or purely rotational motion occurs from timepoint 1 to timepoint 2). When the motion compensation 222 is inaccurate, the mean magnitude is expected to be high (e.g., where a large amount of motion or translational motion occurs from timepoint 1 to timepoint 2).

The motion compensation confidence indicator 226 may be utilized as at least one basis to select a filter weight for performing temporal filtering to filter image 206 with motion compensated image 224 to generate an output image. For instance, the motion compensation confidence indicator 226 may comprise or be used to generate a reliability value 228. In one example, the reliability value 228 is calculated via $r(\text{mag})=\min(\text{mag},1)$, where r takes a value within a range of 0 to 1 and where mag is the optical flow mean magnitude discussed above in association with the motion compensation confidence indicator 226. An r value of 0 may correspond to highest reliability and an r value of 1 may correspond to lowest reliability.

The reliability value 228 may be used as an input to determine a filter weight. For instance, different r values may be associated with different filter weight values (or different sets of filter weight values or different weight curves of a weight function defining weight values) for temporally filtering image 206 with motion compensated image 224 to generate an output image. As another example, $r=0$ may be associated with a high filter weight (or set of filter weights) $w_0$, $r=0.5$ may be associated with a lower filter weight (or set of filter weights) $w_{0.5}$, and $r=1$ may be associated with an even lower filter weight (or set of filter weights) $w_1$. In some instances, a system may calculate r (i.e., reliability value 228) based on motion compensation confidence and select one or more of $w_0$, $w_{0.5}$, and/or $w_1$ to use as (or use to calculate) the filter weight. Continuing with the above example, a system may select one or more filter weights that are associated with r values that are nearest to the calculated r value and interpolate the selected filter weight(s) to output a final filter weight. By way of specific example, for a calculated r value of 0.25, the two nearest weights are $w_0$ and $w_{0.5}$, and linear (or other) interpolation may be performed to obtain a final filter weight via $0.5*w_0+0.5*w_{0.5}$.

Figure 2E:
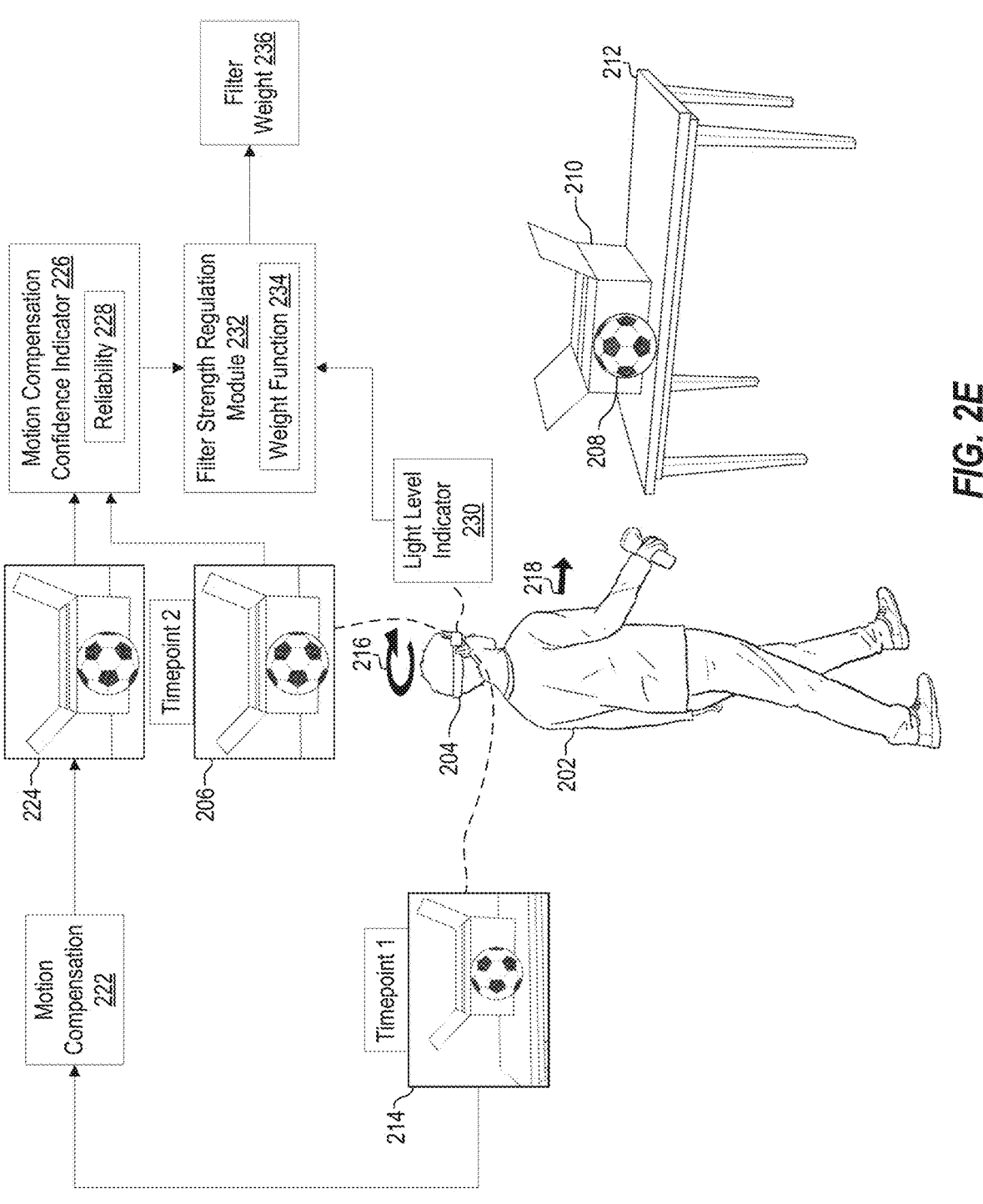
FIG. 2E illustrates a conceptual representation of determining a filter weight based on a light level indicator and/or a motion compensation confidence indicator.

In some instances, a motion compensation confidence indicator 226 is utilized in combination with other factors, variables, and/or inputs for selecting a filter weight for temporally filtering image 206 with motion compensated image 224 to generate an output image. FIG. 2E illustrates a conceptual representation of determining a filter weight 236 based on the motion compensation confidence indicator 226 (or the reliability value 228) and a light level indicator 230. The light level indicator 230 may be obtained in association with acquisition of image 206, image 214, or another image. The light level indicator 230 is representative of light level in the scene or environment captured in image 206, image 214, etc. The light level may take on various forms and be measured in various ways. For example, light level may be determined using a single pixel camera on the HMD 204 to determine light level in the environment. As another example, light level may be estimated based on histogram data associated with image 206, image 214, etc.

As yet another example, the light level indicator 230 may comprise a gain setting applied in tone mapping. In tone mapping, the gain setting may comprise a multiplier applied on the filtered image to generate an output image viewed by the user (e.g., an 8-bit output image). Gain may be chosen to achieve a desired amount of image contrast in the output image (e.g., such that all possible 8-bit values are used in the tone-mapped image). For instance, if the light level is very low, the filtered (i.e., tone-mapped) image may include small intensities, resulting in a large gain setting. Gain may thus be utilized as a proxy or indicator of light level in a captured scene (i.e., as a light level indicator 230).

FIG. 2E conceptually depicts the motion compensation confidence indicator 226 and the light level indicator 230 (or information based thereupon) utilized as input to a filter strength regulation module 232, which processes the input to determine or generate a filter weight 236. FIG. 2E illustrates the filter strength regulation module 232 as implementing a weight function 234 to determine the filter weight 236. In some implementations, the weight function 234 defines weights for corresponding light level indicator 230 values. For instance, when gain is utilized as a light level indicator 230, the weight function 234 may define one or more weights for each potential gain setting.

The weights of a weight function 234 may be selected such that the spatial noise perceived by the user (after temporal filtering with the weight(s)) is substantially similar across all light levels. Such a selection of weights may provide users with a consistent level of image quality in output imagery regardless of signal/light level. As used herein, the spatial noise of an image refers to the standard deviation of intensities computed over all pixels (for an image that observes a uniformly colored surface under the same light condition, where all pixels would record the same intensity in the absence of noise, but where in practice intensity deviations exist due to noise).

Figure 3:
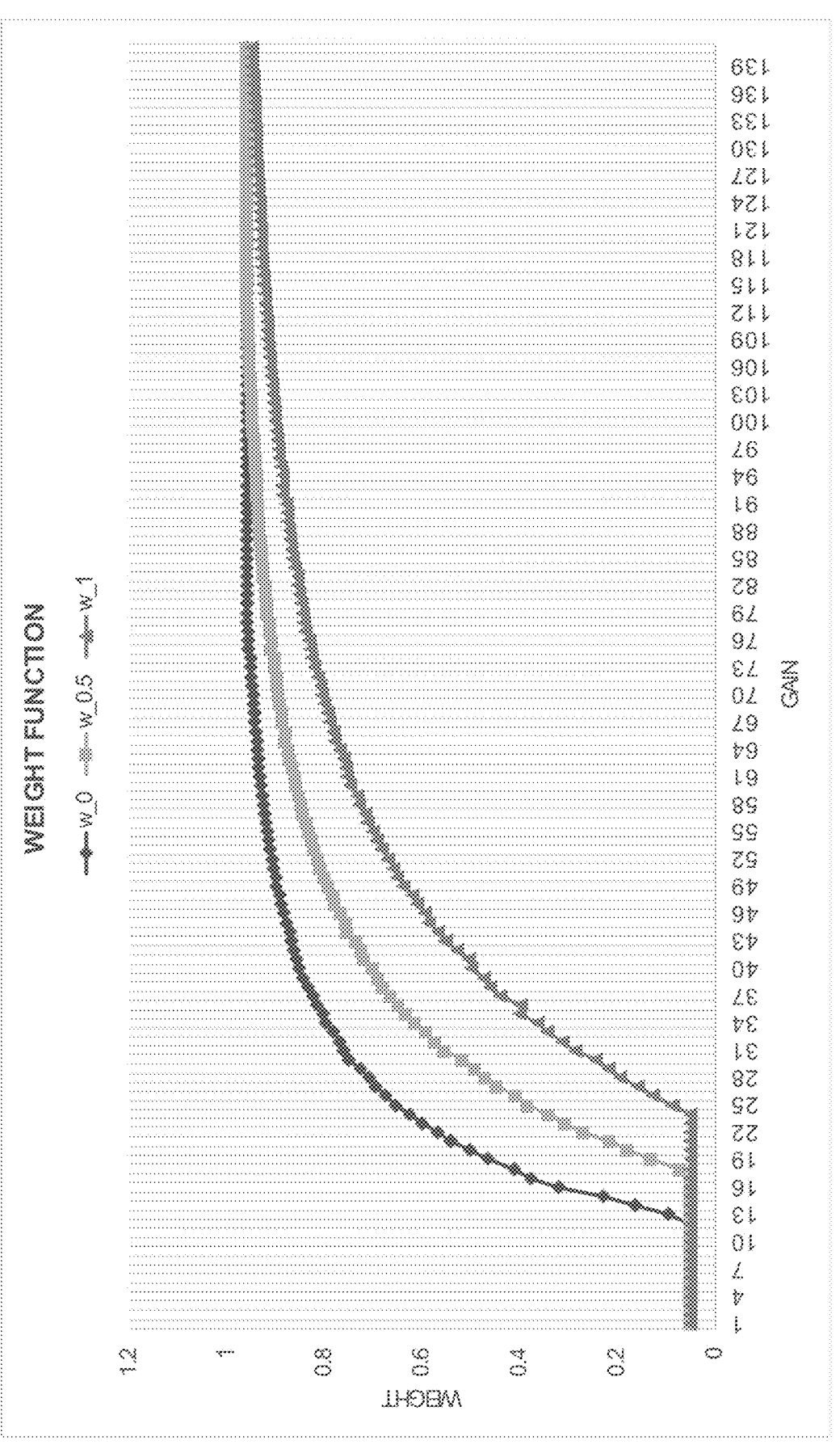
FIG. 3 illustrates an example weight function usable to determine a filter weight based on a light level indicator and/or a motion compensation confidence indicator.

FIG. 3 illustrates an example weight function corresponding to weight function 234, which may be usable to determine a filter weight based on a light level indicator 230 and/or a motion compensation confidence indicator 226. As noted above, the weight function 234 may define one or more weights for each possible gain setting (or other light level indicator value). The weight function 234 of FIG. 3 depicts different weight curves, which are each associated with different spatial noise settings. Each different weight curve (associated with its respective spatial noise setting) defines weights for each possible gain value. The different weight curves of the weight function 234 of FIG. 3 are denoted by "w_0" (represented with diamond shapes), "w_0.5" (represented with square shapes), and "w_1" (represented with triangle shapes). Although the weight function 234 of FIG. 3 includes three weight curves associated with different spatial noise settings, a weight function usable for temporal filter strength regulation may include any quantity of weight curves.

Each weight curve of the weight function 234 may be generated by performing noise simulation to determine the weights that approximate (when applied to input imagery) the spatial noise setting associated with the weight curve. A filter weight that approximates the associated spatial noise setting (when applied to input imagery) may be determined for each possible light level indicator value (e.g., each possible gain setting). By way of illustrative example, a weight for a particular light level indicator value of a weight curve of a weight function 234 may be defined via noise simulation by (i) selecting a target intensity value and converting the target intensity value into a linear value (e.g., a pixel count); (ii) generating a set of images where each image includes the linear value for all pixels; (iii) simulating noise in each image of the set of images; (iv) for each potential weight value for the particular light level indicator value (e.g., gain setting): (a) generating a filtered image using the set of images (after noise simulation), (b) converting the filtered image into an intensity image, and (c) determining noise characteristics of the intensity image; and (iv) defining the weight for the particular light level indicator value as the potential weight value that is associated with noise characteristics that approximate the spatial noise setting associated with the weight curve.

As a concrete example of determining weights for a weight curve of a weight function 234, given a target spatial noise setting (or a target standard deviation), a function $f(g)$ may be determined using a simulator described as follows. For a given gain g, a target intensity may be selected, such as 128 (or another value). Given the gain g and the gamma function to be applied, the target intensity may be converted into a photon count (also known as a linear value). 100 images (or another quantity of images) with a resolution of 1024×1024 (or another resolution) may then be generated where every pixel is assigned to the photon count/linear value. Poisson noise (or another type of noise) may be added to every pixel value to simulate shot noise. For a given filter weight w, a filtered image F may be computed using the 100 images as input. Gamma correction and gain may be applied to F to convert from a photon count image F to an intensity image F'. This may result in the average intensity of F' being close to 128 (or the selected target intensity), but with a varying amount of spatial noise depending on the values of w and g. This spatial noise may be measured as the standard deviation of F'. For a given gain g, the foregoing may be iterated over many weights w to find the value of w that is closest to the target standard deviation or target spatial noise setting (e.g., when applied to generate a filtered image F and an intensity image F'). The value of w that is closest to the target standard deviation may be stored for the given gain g in a weight function 234 (e.g., on the weight curve that corresponds to the given target standard deviation or target spatial noise setting). Once w has been found for every g (and for every target standard deviation/spatial noise setting or weight curve associated therewith), the weight function 234 may be regarded as fully defined.

As noted above, FIG. 3 shows the weight function 234 having different weight curves (i.e., "w_0", "w_0.5", "w_1") associated with different target spatial noise settings (or target standard deviations). In the example of FIG. 3, the w_0 weight curve is associated with a low target spatial noise/standard deviation, and w_1 is associated with a high target spatial noise/standard deviation. Each weight curve defines weights for each potential gain setting (or at least a plurality of potential gain settings) in accordance with its associated target spatial noise/standard deviation. As is evident from FIG. 3, the weight function 234 indicates that more filtering is to be applied (i.e., weight values are higher) for higher gain settings and for lower standard deviations. In the example of FIG. 3, weights are clamped to a ceiling value (0.9625 in the example of FIG. 3) to ensure that the influence of the current image on the filter result does not drop below a certain threshold.

In some instances, the spatial noise setting (or target spatial noise) that governs each weight curve of the weight function 234 is determined based on user data. FIG. 4 illustrates a table of spatial noise data collected from a user study, which may be used to constrain weight curves of a weight function for determining filter weights. It shall be noted that any study or experiment results included herein are provided byway of illustration and were performed under specific conditions; accordingly, neither these experiments nor their results shall be used to limit the scope of the present disclosure.

The information of the table of FIG. 4 was collected pursuant to a user study for determining filter strength under different light levels and motion compensation reliabilities. The goal of the user study was to determine a target standard deviation (under each combination of light level and motion compensation reliability) that provided a desirable balance between image noise and image artifacts (e.g., motion trails). The user study was performed in a controlled room that accurately simulated different light levels that typically occur in nighttime outdoor scenarios. Each simulated light level was associated with a respective gain value/setting.

The simulated light levels were full moon (gain of 14), quarter moon (gain of 20), high starlight (gain of 30), and low starlight (gain of 69).

To simulate different motion compensation reliabilities, the user was asked to stand still (to simulate no motion), to walk slowly (to simulate slow motion), and to walk fast (to simulate high motion). Motion compensation reliability was observed to worsen with increased motion speed. Each different motion speed was associated with a respective reliability value. No motion was associated with an r value of 0 (indicating high reliability), slow motion was associated with an r value of 0.5 (indicating lower reliability), and fast motion was associated with an r value of 1 (indicating even lower reliability).

Multiple spatial noise settings (e.g., target standard deviations) were presented to the user for each combination of light level and motion compensation reliability. The user was asked to select a spatial noise setting that achieves a desirable tradeoff between image noise and motion artifacts (e.g., motion trails). FIG. 4 depicts the spatial noise settings selected by the user for each combination of light level and motion compensation reliability.

A weight function, such as that shown in FIG. 3, may be constructed utilizing spatial noise setting information determined based on user data/feedback, such as that shown in FIG. 4. For instance, the spatial noise settings of FIG. 4 may be used to populate three curves (one for each different motion compensation reliability value) on a spatial noise setting vs gain graph. The gains associated with simulated light levels (i.e., gains of 14, 20, 30, and 69) may be used as control points on the curves of the spatial noise setting vs gain graph, with linear interpolation performed to fill in remaining gain values along each curve. The spatial noise settings (or target standard deviations) of the separate curves may be converted into weights using the noise simulation process described above, resulting in weight curves (e.g., $w\_0$, $w\_0.5$, $w\_1$) that define weights for each gain value.

In practice, to utilize the weight function 234 ($f'(g, r)$, see FIG. 3) to determine a filter weight 236, a filter strength regulation module 232 may receive the motion compensation confidence indicator 226 (or reliability value 228, r) and the light level indicator 230 (e.g., gain, g) as inputs. Based on the reliability value, r, which can be a value within a range of 0 to 1, the filter strength regulation module may determine one or more relevant weight curve(s) ($w\_0$, $w\_0.5$, and/or $w\_1$) that is/are associated with reliability values nearest to r. One or more specific weight values from the relevant weight curve(s) may be selected based on the gain g, and interpolation may in some instances be applied to provide the final filter weight 236.

Figure 2F:
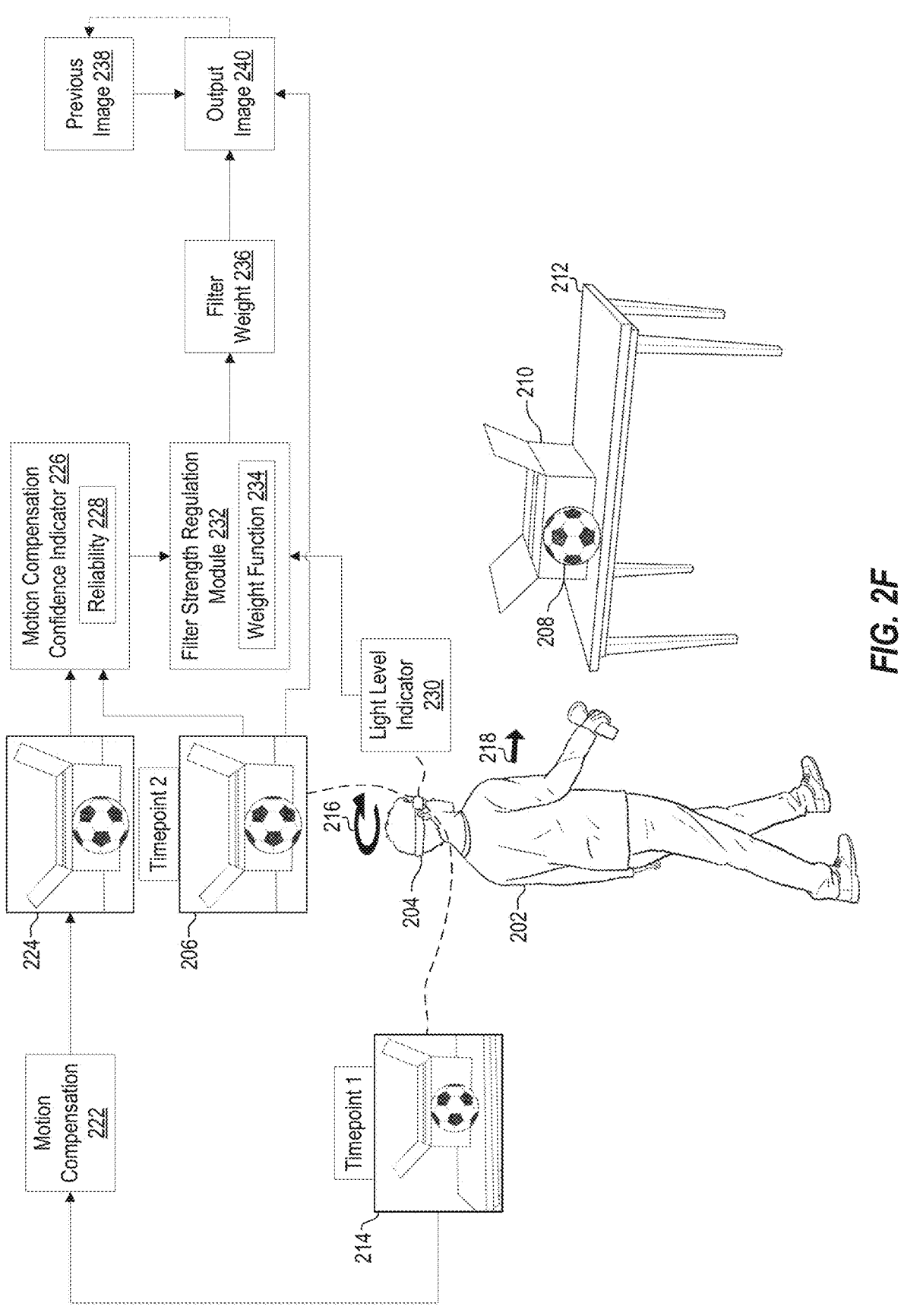
FIG. 2F illustrates a conceptual representation of generating an output image using the filter weight, the current image, and a previous image.

FIG. 2F conceptually depicts utilizing the filter weight 236 (generated via the filter strength regulation module 232 implementing the weight function 234 to process the reliability value 228 and the light level indicator 230), image 206, and a previous image 238 (which may comprise motion compensated image 224) to generate an output image 240. Various modifications (e.g., motion compensation) may be performed on a previous image 238 pursuant to filtering with a current image 206 via a filter weight 236 to form an output image 240. The output image 240 may be further processed and/or presented on a display (e.g., pursuant to an MR experience).

In some instances, the previous image 238 is a previously generated output image (or a motion compensated previously generated output image). In this regard, the output image 240 may be stored as a previous image for a subsequent iteration (indicated by the dashed arrow extending from output image 240 to previous image 238 in FIG. 2F).

Although the foregoing example focuses on an implementation in which both motion compensation reliability and light level are used as bases for determining a filter weight, motion compensation reliability and light level may be used independently and/or individually (e.g., in the absence of the other) to determine filter weight. For instance, a system may select weights and/or a final filter weight from a weight function using a basis that is different from motion compensation reliability (e.g., arbitrary or random selection, or selection based on other criteria). A system may select weight values based on motion compensation reliability without regard to gain setting (or another proxy for light level).

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 7:
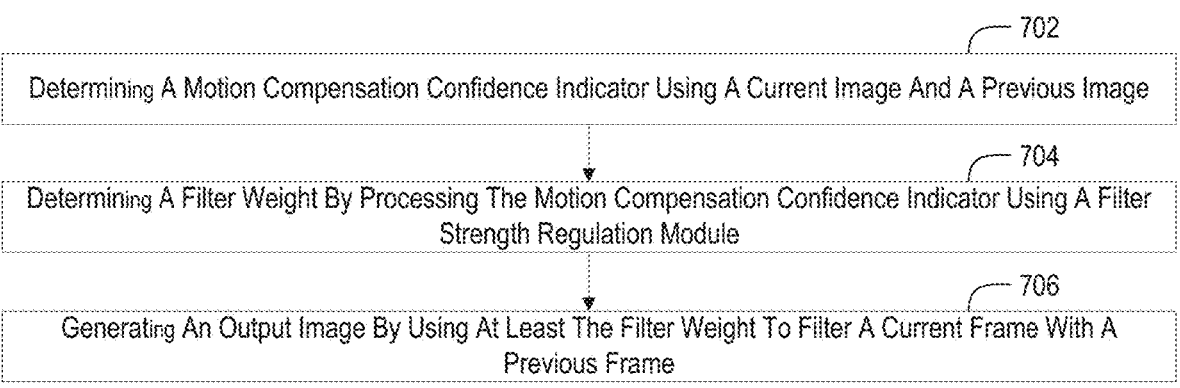

FIGS. 5, 6, and 7 illustrate example flow diagrams 500, 600, and 700, respectively, depicting acts associated with regulating filter strength for temporal filtering, in accordance with implementations of the present disclosure.

Act 502 of flow diagram 500 of FIG. 5 includes obtaining a light level indicator indicating light level associated with a real-world environment. In some instances, the light level indicator comprises a gain setting associated with the current frame.

Act 504 of flow diagram 500 includes determining a motion compensation confidence indicator using a current image and a previous image. In some implementations, the previous image comprises a motion compensated previous image. In some examples, determining the motion compensation confidence indicator comprises determining an optical flow magnitude between the current image and the previous image.

Act 506 of flow diagram 500 includes determining a filter weight by processing the light level indicator and the motion compensation confidence indicator using a filter strength regulation module. In some instances, processing the light level indicator and the motion compensation confidence indicator using the filter strength regulation module comprises: (i) determining a plurality of weights based on the motion compensation confidence indicator and the light level indicator; and (ii) interpolating the plurality of weights to obtain the filter weight. In some implementations, the plurality of weights is selected using a weight function that, for each of a plurality of spatial noise settings, defines a weight for each of a plurality of light level indicator values. In some examples, the weight function is generated by performing noise simulation to determine, for each particular spatial noise setting of the plurality of spatial noise settings, the weight for each of the plurality of light level indicator values that approximates, when applied to input imagery, the particular spatial noise setting. In some instances, the weight for each particular light level indicator value of the plurality of light level indicator values is selected by: (i) converting a target intensity value into a linear value; (ii) generating a plurality of images where each pixel comprises the linear value with simulated noise; (iii) for each potential weight value for the particular light level indicator value: (a) generating a filtered image using the plurality of images as input; (b) converting the filtered image into an intensity image; and (c) determining noise characteristics of the intensity image; and (iv) defining the weight for the particular light level indicator value as the potential weight value that is associated with noise characteristics that approximate a target spatial noise setting. In some implementations, determining the plurality of weights based on the motion compensation confidence indicator comprises: (i) converting the motion compensation confidence indicator into a reliability value; and (ii) selecting the plurality of weights based on the reliability value and the light level indicator.

Act 508 of flow diagram 500 includes generating an output image by using at least the filter weight to filter a current frame with a previous frame. In some examples, the previous frame comprises a previously generated output image.

Act 602 of flow diagram 600 of FIG. 6 includes capturing an image frame of a real-world environment using the one or more image sensors.

Act 604 of flow diagram 600 includes obtaining a light level indicator indicating light level associated with the real-world environment. In some instances, the light level indicator comprises a gain setting associated with the current frame.

Act 606 of flow diagram 500 includes determining a filter weight by processing the light level indicator using a filter strength regulation module that implements a weight function generated via noise simulation, wherein the weight function defines a weight for each of a plurality of light level indicator values. In some implementations, the weight function is generated by performing noise simulation to determine the weight for each of the plurality of light level indicator values that approximates, when applied to input imagery, at least one spatial noise setting. In some examples, the weight for each particular light level indicator value of the plurality of light level indicator values is selected by: (i) converting a target intensity value into a linear value; (ii) generating a plurality of images where each pixel comprises the linear value with simulated noise; (iii) for each potential weight value for the particular light level indicator value: (a) generating a filtered image using the plurality of images as input; (b) converting the filtered image into an intensity image; and (c) determining noise characteristics of the intensity image; and (iv) defining the weight for the particular light level indicator value as the potential weight value that is associated with noise characteristics that approximate a target spatial noise setting.

Act 608 of flow diagram 500 includes generating an output image by using at least the filter weight to filter a current frame with a previous frame. In some instances, the previous frame comprises a previously generated output image.

Act 610 of flow diagram 500 includes presenting the output image on a display of the system.

Act 702 of flow diagram 700 of FIG. 7 includes determining a motion compensation confidence indicator using a current image and a previous image. In some implementations, the previous image comprises a motion compensated previous image. In some examples, determining the motion compensation confidence indicator comprises determining an optical flow magnitude between the current image and the previous image.

Act 704 of flow diagram 700 includes determining a filter weight by processing the motion compensation confidence indicator using a filter strength regulation module. In some instances, wherein processing the motion compensation confidence indicator using the filter strength regulation module comprises: (i) determining a plurality of weights based on the motion compensation confidence indicator; and (ii) interpolating the plurality of weights to obtain the filter weight. In some implementations, determining the plurality of weights based on the motion compensation confidence indicator comprises: (i) converting the motion compensation confidence indicator into a reliability value; and (ii) selecting the plurality of weights based on the reliability value.

Act 706 of flow diagram 500 includes generating an output image by using at least the filter weight to filter a current frame with a previous frame.

Additional Details Related to the Disclosed Embodiments

Disclosed embodiments may comprise or utilize a special-purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "computer-readable recording media", "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry program code in the form of computer-executable instructions or data structures, and which can be accessed by a general-purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa).

For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein.

Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for regulating filter strength for temporal filtering, comprising:
   one or more processors; and
   one or more computer-readable recording media that store instructions that are executable by the one or more processors to configure the system to:
   obtain a light level indicator indicating light level associated with a real-world environment;
   determine a motion compensation confidence indicator using a current image and a previous image;
   convert the motion compensation confidence indicator into a reliability value;
   determine a filter weight by processing the light level and the reliability value using a filter strength regulation module; and
   generate an output image by using at least the filter weight to filter a current frame with a previous frame.

2. The system of claim 1, wherein the light level indicator comprises a gain setting associated with the current frame.

3. The system of claim 1, wherein the previous image comprises a motion compensated previous image.

4. The system of claim 1, wherein determining the motion compensation confidence indicator comprises determining an optical flow magnitude between the current image and the previous image.

5. The system of claim 1, wherein processing the light level indicator and the reliability value using the filter strength regulation module comprises:
   determining a plurality of weights based on the reliability value and the light level indicator; and
   interpolating the plurality of weights to obtain the filter weight.

6. The system of claim 5, wherein the plurality of weights is selected using a weight function that, for each of a plurality of spatial noise settings, defines a weight for each of a plurality of light level indicator values.

7. The system of claim 6, wherein the weight function is generated by performing noise simulation to determine, for each particular spatial noise setting of the plurality of spatial noise settings, the weight for each of the plurality of light level indicator values that approximates, when applied to input imagery, the particular spatial noise setting.

8. The system of claim 6, wherein the weight for each particular light level indicator value of the plurality of light level indicator values is selected by:
   converting a target intensity value into a linear value;

generating a plurality of images where each pixel comprises the linear value with simulated noise;

for each potential weight value for the particular light level indicator value:

generating a filtered image using the plurality of images as input;

converting the filtered image into an intensity image; and determining noise characteristics of the intensity image; and defining the weight for the particular light level indicator value as the potential weight value that is associated with noise characteristics that approximate a target spatial noise setting.

9. The system of claim 1, wherein the previous frame comprises a previously generated output image.

10. A system for regulating filter strength for temporal filtering, comprising:

one or more image sensors;

one or more processors; and one or more computer-readable recording media that store instructions that are executable by the one or more processors to configure the system to:

capture an image frame of a real-world environment using the one or more image sensors;

obtain a light level indicator indicating light level associated with the real-world environment;

determine a filter weight by processing the light level indicator using a filter strength regulation module that implements a weight function generated via noise simulation, wherein the weight function defines a weight for each of a plurality of light level indicator values, wherein the weight for each particular light level indicator value of the plurality of light level indicator values is selected by:

converting a target intensity value into a linear value;

generating a plurality of images where each pixel comprises the linear value with simulated noise;

for each potential weight value for the particular light level indicator value:

generating a filtered image using the plurality of images as input;

converting the filtered image into an intensity image; and determining noise characteristics of the intensity image; and defining the weight for the particular light level indicator value as the potential weight value that is associated with noise characteristics that approximate a target spatial noise setting;

generate an output image by using at least the filter weight to filter a current frame with a previous frame; and present the output image on a display of the system.

11. The system of claim 10, wherein the light level indicator comprises a gain setting associated with the current frame.

12. The system of claim 10, wherein the previous frame comprises a previously generated output image.

13. A system for regulating filter strength for temporal filtering, comprising:

one or more processors; and one or more computer-readable recording media that store instructions that are executable by the one or more processors to configure the system to:

determine a motion compensation confidence indicator using a current image and a previous image;

convert the motion compensation confidence indicator into a reliability value;

determine a filter weight by processing the reliability value using a filter strength regulation module; and generate an output image by using at least the filter weight to filter a current frame with a previous frame.

14. The system of claim 13, wherein the previous image comprises a motion compensated previous image.

15. The system of claim 13, wherein determining the motion compensation confidence indicator comprises determining an optical flow magnitude between the current image and the previous image.

16. The system of claim 13, wherein processing the reliability value using the filter strength regulation module comprises:

determining a plurality of weights based on the reliability value; and interpolating the plurality of weights to obtain the filter weight.

17. The system of claim 1, wherein the reliability value is based on an optical flow mean magnitude associated with the motion compensation confidence indicator.

18. The system of claim 13, wherein the reliability value is based on an optical flow mean magnitude associated with the motion compensation confidence indicator.

* * * * *